United States Patent [19]
Ter Braak

[11] Patent Number: 5,962,061
[45] Date of Patent: Oct. 5, 1999

[54] PROCESS AND APPARATUS FOR THE PRODUCTION OF CONFECTIONARY MASS

[75] Inventor: Johannes Gerardus Ter Braak, Delft, Netherlands

[73] Assignee: Ter Braak B.V., Rotterdam, Netherlands

[21] Appl. No.: 08/894,949

[22] PCT Filed: Mar. 7, 1996

[86] PCT No.: PCT/NL96/00108

§ 371 Date: Sep. 4, 1997

§ 102(e) Date: Sep. 4, 1997

[87] PCT Pub. No.: WO96/27297

PCT Pub. Date: Sep. 12, 1996

[30] Foreign Application Priority Data

Mar. 7, 1995 [NL] Netherlands ............... 9500452

[51] Int. Cl.[6] ................................... A23G 1/00
[52] U.S. Cl. .................. 426/580; 426/519; 426/523; 426/660; 99/325; 99/329 R; 99/348; 99/468; 99/472
[58] Field of Search .................. 426/660, 509, 426/510, 511, 519, 520, 523, 580, 585; 99/348, 453, 472, 467, 468, 470, 477, 486, 325, 326, 339, 329 R, 352, 355, 367, 409, 331

[56] References Cited

U.S. PATENT DOCUMENTS

| | | | |
|---|---|---|---|
| 2,122,016 | 6/1938 | Stokes | 99/134 |
| 2,835,589 | 5/1958 | Whitefield | 99/134 |
| 2,995,451 | 8/1961 | Leach | 99/134 |
| 3,356,045 | 12/1967 | Karpenko et al. | 107/4 |
| 3,356,508 | 12/1967 | Willits et al. | 99/142 |
| 3,607,309 | 9/1971 | Olney et al. | 99/134 |
| 3,615,645 | 10/1971 | Forkner | 99/134 |
| 3,860,725 | 1/1975 | Forkner | 426/44 |
| 3,860,731 | 1/1975 | Forkner | 426/199 |
| 3,899,606 | 8/1975 | Forkner | 426/250 |
| 3,910,346 | 10/1975 | ter Braak | 165/109 |
| 4,113,890 | 9/1978 | Long | 426/512 |
| 4,269,864 | 5/1981 | Chirafisi | 426/583 |
| 4,346,121 | 8/1982 | Turos | 426/580 |

FOREIGN PATENT DOCUMENTS

| | | |
|---|---|---|
| 1367452 | 6/1964 | France . |
| 1519748 | 2/1968 | France . |
| 1954489 | 7/1970 | Germany . |
| 05 065 482 | 3/1993 | Japan . |
| 5-339299 | 12/1993 | Japan . |
| 61786 | 1/1971 | Luxembourg . |
| 63460 | 11/1971 | Luxembourg . |
| 65653 | 10/1972 | Luxembourg . |
| 648053 | 2/1985 | Switzerland . |
| 702302 | 1/1954 | United Kingdom . |

OTHER PUBLICATIONS

R. Lees et al., "Sugar Confectionery and Chocolate Manufacture", 1973, pp. 194–199.

Chemical Abstracts, vol. 80, No. 1, Jan. 1974, p. 220, "Food Coloring".

Confectionery Production, vol. 39, No. 3, Aug. 1973, pp. 443–446, "The Continuous Production of Soft Caramels".

*Primary Examiner*—Cynthia L. Nessler
*Attorney, Agent, or Firm*—Young & Thompson

[57] ABSTRACT

Process and apparatus for the production of confectionary mass from the components of milk proteins, sugar, glucose, fat and water. The components are homogenized in a closed tank under controlled pressure and temperature and are transferred from the closed tank to a scraped surface rotor cooker at a pressure between 0.2 and 0.9 bar absolute. The components are retained in the cooker for a period of 4 to 10 seconds, then transferred from the cooker to an evaporation chamber that is in open connection with the cooker and that is at a pressure of 0.2 to 0.9 bar absolute. Steam from the evaporation chamber is condensed in a condenser connected to a vacuum chamber. The product is withdrawn from the vacuum chamber at a temperature below 100° C. When little or no Maillard reaction is desired, the closed tank is maintained at a pressure no more than 1 bar absolute at a temperature between 40° C. and 90° C. But when Maillard caramelization is desired, the closed tank is maintained at a pressure between 2 and 4 bars absolute and a temperature between 110° C. and 140° C.

4 Claims, 1 Drawing Sheet

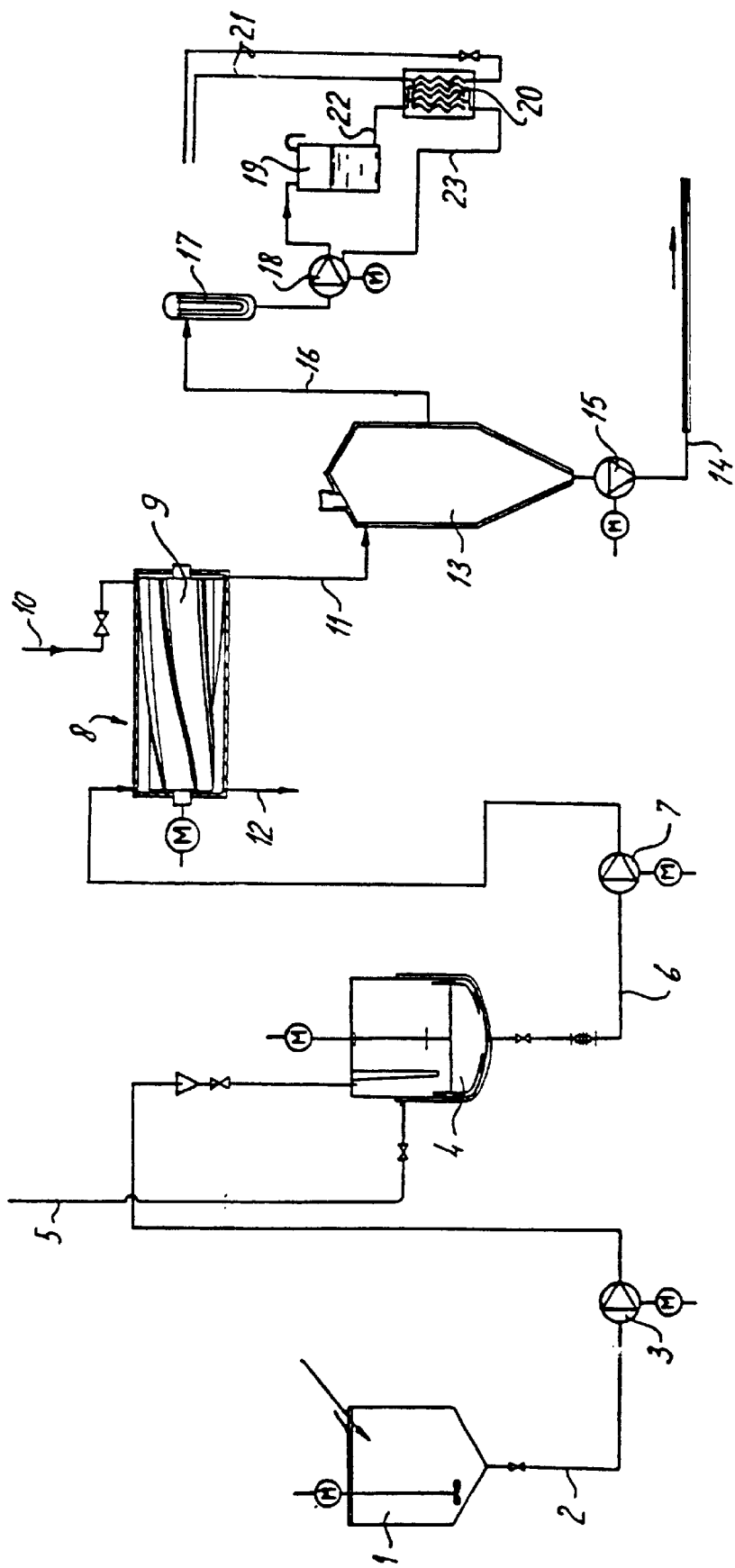

PROCESS AND APPARATUS FOR THE PRODUCTION OF CONFECTIONARY MASS

This application was filed under 35 USC 371 as a national stage application of international application PCT/NL96/00108, filed Mar. 7, 1996.

In the first instance, the invention relates to a process for the production of confectionary mass from at least the components milk proteins, sugar, glucose, fat and water.

Boiling a homogenized mixture of the abovementioned components at a temperature between 120 and 140° C. in a so-called cooking coil and then evaporating it at reduced pressure is a known practice. The milk proteins are subjected to the so-called Maillard reaction, by which the mixture is converted to a caramelized brown toffee. In some cases, discolouration by the Maillard reaction is unwanted and the confectionary mass containing the milk proteins should be white or creamy white. In other cases, an accelerated Maillard reaction, allowing a faster production process, is desirable.

These objectives can be met according to the invention if the components are mixed, homogenized in a closed tank and then dehydrated in a short time by means of a closed cooking installation, and the extent to which the milk proteins are subjected to the caramelizing Maillard reaction is determined by the choice of pressure and temperature in the homogenizing tank.

In order to ensure that there is little or no Maillard reaction and that despite its milky character the confectionary mass produced undergoes little or no caramelizing reaction, the mixed components are homogenized in a closed tank at a pressure of 1 bar or less and a temperature between 40 and 90° C., the homogenized components are then cooked for 4 to 10 sec at a temperature between 100 and 115° C. and a reduced pressure between 0.2 and 0.9 bar absolute in a scraped-surface cooker, in a flow-through or continuous system, then evaporated at essentially the same low pressure in an evaporation chamber which is in open connection with the rotor chamber, the moisture from the evaporation chamber is condensed with the aid of a condensor, and the product coming out of the vacuum chamber is removed at a temperature lower than 100° C. Because the homogenization takes place at relatively low temperature and at a pressure which is not increased, and because the homogenized mass is only cooked for a short period (about 5 sec for example) at reduced pressure in a scraped-surface cooker at a temperature only slightly above 100° C., the Maillard reaction does not take place. The horizontal cylindrical tank of the scraped-surface cooker is in open connection with the vacuum evaporation chamber where the second phase of the evaporation takes place, and the cooking (in actual fact the first evaporation phase) takes place at reduced pressure and relatively low temperature (much lower than the usual 120 to 140° C.).

The homogenization should then preferably be between 50 and 70° C., and the pressure in the vacuum chamber between 0.2 and 0.5 bar.

The rotation speed of the rotor in the rotor chamber should be between 600 and 800 revolutions per minute (preferably about 700 revolutions per minute).

The moisture from the vacuum chamber should be conveyed to a condenser, where it condenses.

If an accelerated reaction with rapid caramelization is desired, the mixed components are homogenized at a pressure of 2–4 bar absolute and a temperature between 110 and 140° C., and caramelized, and the homogenized and caramelized components are then cooked for 4–10 sec at a pressure of 0.2–0.9 bar absolute in a scraped-surface cooker, then evaporated at essentially the same low pressure in an evaporation chamber which is in open connection with the rotor chamber, the moisture from the evaporation chamber is condensed with the aid of a condenser, and the product coming from the vacuum chamber is removed at a temperature lower than 100° C.

The invention also relates to an installation for carrying out the abovementioned process, and this installation comprises: a homogenizer in the form of a closed tank which in turn is connected to a scraped-surface cooker, in the form of a closed cylindrical tank with a rotor which can be rotated therein, with one or more helical blades, the outer edges of which can run along the internal surface of the tank; a vacuum chamber which is in open connection with the said scraped-surface cooker and which is connected to a vacuum pump; and a condensor for condensing the moisture released from the vacuum chamber.

BRIEF DESCRIPTION OF THE DRAWING

The invention will now be explained by means of the FIGURE. This FIGURE shows a diagram of the installation with which the invention can be put into practice.

The following parts can be distinguished in the diagram shown:

1=closed pre-mixing tank in which the components—milk proteins, sugar, glucose, fat and water (and possibly other components)—are pre-mixed at a temperature of about 40° C. and a pressure of about 1 bar into a uniform mixture,
2=the pipeline for removal of the pre-mixed components,
3=a feed pump,
4=a closed homogenizer tank in which the pre-mixed components are homogenized,
5=a steam supply
6=a pipeline for removal of the homogenized mass,
7=a feed pump,
8=a scraped-surface cooker consisting of a horizontal cylindrical tank in which a rotor can be rotated, for example with a rotation speed of 700 revolutions per minute,
9=helical blades, made of teflon, which are fixed on an axis of rotation of the rotor and which can run along the internal surface of the cylindrical tank of the scraped-surface cooker and throw the mass to be dehydrated, by means of centrifugal force, onto that internal surface, where a film about 1 mm thick can form,
10=a steam supply to the scraped-surface cooker 8,
11=a pipeline for removal of the treated mass cooking in the scraped-surface cooker,
12=a condensate drain from the scraped-surface cooker 8,
13=a vacuum chamber used as an evaporation chamber, in open connection with the scraped-surface cooker 8 via the abovementioned pipeline
14=a pipeline for removal of the dehydrated product, 11,
15=a pump,
16=a pipeline for removal of cooking vapours,
17=a condensor,
18=a vacuum pump to produce a partial vacuum (between 0.2 and 0.9 bar) in the vacuum chamber and remove condensate,
19=a water tank,
20=a cooler,
21=coolant circulation pipelines,
22=the inlet pipeline for condensate water to be cooled,
23=the outlet pipeline for cooled condensate water.

In a first application of the invention, the homogenization should take place in such a way that there is little or no caramelizing Maillard reaction. To this end the pre-mixed components are homogenized in the abovementioned closed homogenizer tank 4 at a pressure of 1 bar or less and a temperature between 40 and 90° C., and depending on the quantity of milk proteins, preferably at a temperature between 60 and 70° C.

The homogenized liquid mass remains in the scraped-surface cooker for only 4 to 10 sec, preferably about 5 sec. The temperature in the scraped-surface cooker is between 100 and 115° C., and the pressure, because of the direct connection 11 to the vacuum chamber 13, is at approximately the same low level as in this vacuum chamber. The treatment in the scraped-surface cooker constitutes the first evaporation phase in fact, and that in the vacuum chamber the second evaporation phase. The dehydrated confectionary mass, caramelized only slightly or not at all, is cooled and removed.

According to the invention, the cooking pan which is usually employed is replaced by a scraped-surface cooker 8 which is directly connected to the vacuum chamber 13. There is essentially no caramelization in the initial phase of evaporation in this scraped-surface cooker 8, which takes place for a short period at a relatively low temperature (100–115° C.) and reduced pressure (0.2–0.9 bar absolute). Care is also taken to ensure that there is no Maillard reaction in the preliminary phase (pre-mixing and homogenization). The final product shows little or no yellowing and can be clearly distinguished from the usual brown toffee mass.

If it is desired to accelerate the Maillard reaction, the mixed components are homogenized and caramelized at a pressure of 2 to 4 bar absolute and a temperature between 110 and 140° C. The homogenized and caramelized components are then cooked in a scraped-surface cooker for 4 to 10 sec at a pressure of 0.2 to 0.9 bar absolute. Finally the liquid is evaporated at essentially the same low pressure in an evaporation chamber which is in open connection with the rotor chamber, the moisture from the evaporation chamber is condensed with the aid of a condenser, and the product coming out of the vacuum chamber is removed at a temperature lower than 100° C.

An essential feature of the invention is that the components are homogenized in a closed tank and then dehydrated in a short time by means of a closed cooking installation, and the extent to which the milk proteins are subjected to the caramelizing Maillard reaction is determined by the choice of pressure and temperature in the homogenizing tank.

I claim:

1. Process for the production of confectionary mass from the components of milk proteins, sugar, glucose, fat and water, comprising homogenizing said components in a closed tank under controlled pressure and temperature, transferring the components from said closed tank to a scraped surface rotor cooker at a pressure between 0.2 and 0.9 bar absolute and retaining said components in said cooker for a period of 4 to 10 seconds, then transferring said components from said cooker to an evaporation chamber that is in open connection with said cooker and that is at a pressure of 0.2 to 0.9 bar absolute, condensing steam from said evaporation chamber in a condenser connected to a vacuum chamber, and withdrawing the product from said vacuum chamber at a temperature below 100° C.

2. A process as claimed in claim 1, wherein little or no Maillard reaction is desired, and said closed tank is maintained at a pressure no more than 1 bar absolute at a temperature between 40° C. and 90° C.

3. A process as claimed in claim 1, wherein Maillard caramelization is desired, and said closed tank is maintained at a pressure between 2 and 4 bars absolute and a temperature between 110° C. and 140° C.

4. Apparatus for the production of confectionary mass from at least the components milk proteins, sugar, glucose, fat and water, comprising a homogenizer in the form of a closed tank, means to regulate the pressure and temperature within said closed tank, a scraped surface cooker in the form of a closed cylindrical tank with a rotor with at least one helical blade the outer edges of which blade run along an internal surface of said cylindrical tank, means to transfer said components from said homogenizer to said cooker, a vacuum chamber in open communication with said cooker, a vacuum pump for maintaining a pressure of 0.1 to 0.9 bar absolute in said vacuum chamber and hence in said cooker, and a condenser for condensing moisture from the vacuum chamber.

* * * * *